US005908076A

United States Patent [19]

Marcengill et al.

[11] Patent Number: 5,908,076

[45] Date of Patent: Jun. 1, 1999

[54] IMPACT TOOL DRIVER

[75] Inventors: Richard L. Marcengill, Walhalla; Gary L. Young, Six Mile, both of S.C.

[73] Assignee: Power Tool Holders Incorporated, Wilmington, Del.

[21] Appl. No.: 08/781,136

[22] Filed: Jan. 10, 1997

[51] Int. Cl.[6] .............................. B23B 5/22; B23B 31/10

[52] U.S. Cl. ........................... 173/93; 173/93.6; 173/205

[58] Field of Search .......................... 173/93, 93.5, 93.6, 173/97, 29, 109, 205

[56] References Cited

U.S. PATENT DOCUMENTS

| | | | |
|---|---|---|---|
| 1,925,714 | 9/1933 | Crist | 173/93.6 |
| 2,227,627 | 1/1941 | Bruzon | 173/93.6 |
| 2,794,621 | 6/1957 | Beeson | 173/205 |
| 2,923,191 | 2/1960 | Fulop | 173/93.6 |
| 2,940,565 | 6/1960 | Schodeberg | 173/93.6 |
| 3,938,817 | 2/1976 | Röhm . | |
| 3,948,534 | 4/1976 | Schnizler, Jr. et al. . | |
| 4,116,454 | 9/1978 | Schnizler, Jr. et al. . | |
| 4,277,074 | 7/1981 | Kilberia . | |
| 4,434,859 | 3/1984 | Rumpp et al. . | |
| 4,563,013 | 1/1986 | Hunger et al. . | |
| 4,607,855 | 8/1986 | Röhm . | |
| 4,682,918 | 7/1987 | Palm . | |
| 4,695,066 | 9/1987 | Röhm . | |
| 4,703,941 | 11/1987 | Röhm . | |
| 4,955,623 | 9/1990 | Röhm . | |

*Primary Examiner*—Scott A. Smith
*Attorney, Agent, or Firm*—Dority & Manning

[57] ABSTRACT

An impact tool driver is provided and configured for removable attachment to a drive spindle of a power tool, for example a conventional drill. A body member is removably attached to the drive spindle and includes a first impact member containing a number of radially spaced impact lugs defined thereon. Second impact member includes a number of radially spaced impact lugs in engaging and opposing contact with the impact lugs defined on the first impact member. A drive member is connected to the second impact member and is rotational mounted on the body member. The drive member includes a device for connecting a tool or working device thereto. Rotational drive of the body member and the first impact member is imparted to the second impact member and drive member through rotational impacting engagement of the impact lugs.

11 Claims, 5 Drawing Sheets

IMPACT TOOL DRIVER

BACKGROUND OF THE INVENTION

The present invention relates to a drive device configured for attachment to a drive spindle of a power tool, for example a hand drill, and more particularly to a portable tool driver incorporating an impact drive mechanism.

The benefits of impact drive mechanisms are well understood by those skilled in the art. For example, impact drive mechanisms are conventionally incorporated into impact air wrenches and conventional hammer drills. These mechanisms add the additional benefit of a hammering effect to conventional rotational drives.

However, a drawback of conventional impact drive mechanisms is that such devices are typically only incorporated directly into the drive device of the drill or power tool. In other words, the entire tool constitutes the impact drive mechanism, and there are certain situations wherein an impact drive is not desired. Additionally, the impact drive mechanisms of the known conventional devices are relatively sophisticated and expensive to manufacture.

U.S. Pat. No. 4,840,387 to McCarthy describes a keyless chuck device for attachment to a drive spindle of a drill in which the operating sleeve has impact members biased toward mating impact members associated with the rotatable nut. The impact dogs disclosed in the '387 patent are meant to increase the tightening (or loosening) effect of the chuck device on a tool shank carried therein depending on the direction of rotation of the body of the chuck. The chuck does not impart an impact drive to the tool bit once the chuck is tightened onto the tool bit.

OBJECTS AND SUMMARY OF THE INVENTION

It is therefore a principal object of the present invention to provide an impact tool driver which is portable in nature and can be attached to a drive spindle of any conventional tool, such as a conventional power drill.

An additional object of the present invention is to provide an impact tool drive which can be easily carried by any conventional chuck device and which thus converts any conventional drill into an impact drive tool.

Still a further object of the present invention is to provide an impact tool driver which can convert any manner of conventional drive tool to an impact drive tool.

And yet another object of the present invention is to provide an impact tool driver having an impact drive mechanism which is relatively simple and inexpensive to manufacture.

Additional objects and advantages of the invention will be set forth in part in the following description, or may be obvious from the description, or may be learned through practice of the invention.

According to the objects and purposes of the invention, an impact tool driver is provided which is configured for removable attachment to a drive spindle of a power tool, for example a conventional hand drill or similar device. The impact tool driver includes a body member which comprises means for removably attaching the impact tool driver to a drive spindle. The means for attaching can be any conventional attaching means, including any number of well-known mechanical attaching means such as threaded engagements, set screws, tapered bore engagements, etc. The means for attaching can also include mating attachment with a conventional chuck device, such as a keyed chuck or keyless chuck, wherein the body member includes a shank having a length and configuration to be held by the chuck device.

The tool driver also includes a drive member which is rotatably mounted relative to the body member. The drive member includes means for connecting a tool or working device thereto. Any manner of conventional connecting devices can be used in this regard depending on the type of tool desired to be carried by the impact tool driver. For example, the connecting means may include a conventional multi-sided driver, a star configuration drive mechanism, etc. Any and all such connecting devices are within the scope and spirit of the invention.

The tool driver includes an impact drive mechanism operably configured relative to the body member and the drive member to impart rotational drive of the body member to the drive member by periodic rotational impacting of oppositely facing impact lugs carried by the body member and drive member respectively.

In a preferred embodiment of the invention, a first impact member is configured with the body member so as to be rotationally driven thereby. The first impact member includes a first annular face having a plurality of radially spaced apart impact lugs defined thereon. A second impact member includes a second annular face having a plurality of radially spaced impact lugs defined thereon for engaging contact with the impact lugs defined on the first face. In one preferred embodiment, the first impact member is formed integrally with the body member. In this embodiment, a spring mechanism may be provided relative to the body and the drive member so as to bias the body member and drive member towards each other wherein the oppositely facing impact lugs have an initial engaging axial position.

In an alternative preferred embodiment, the first impact member may comprise a component separate from the body member which is axially movable relative to the body member. In this embodiment, a spring mechanism may be disposed between the body member and the first impact member to bias the first impact member towards the second impact member wherein the oppositely facing impact lugs have an initial engaging axial position. This embodiment may also include a bearing mechanism disposed between the body member and the first impact member. The first impact member may be rotationally coupled to the body member by any conventional device, such as a ball drive mechanism. The drive mechanism will define the range of axial movement of the first impact member relative to the body member.

The engaging impact lugs of the first impact member which impart rotational drive to the drive member have angled side surfaces which engage complimenting angled surfaces of opposing impact lugs on the drive member causing it to be driven by the body member. The angle of the side surfaces causes the body member and drive member to be forced axially apart until the angled side surfaces disengage and the impact lugs slide on top of or over each other so that the rotational drive between the body member and drive member is momentarily interrupted until the impact lugs on the body member engage or "hammer" the adjacent set of impact lugs defined on the drive member. Thus, a periodic impacting drive is imparted to the drive member upon rotation of the body member.

The present inventive impact tool driver is useful in any environment wherein an impact drive mechanism is desired, and is not limited to any particular type of mating tool or driver. For instance, although the present impact tool driver will have particular usefulness with portable hand drills, the invention is not limited to this environment. Additional uses and environments are within the scope and spirit of the invention.

DETAILED DESCRIPTION OF THE PREFERRED EMBODIMENTS

Figure 2:
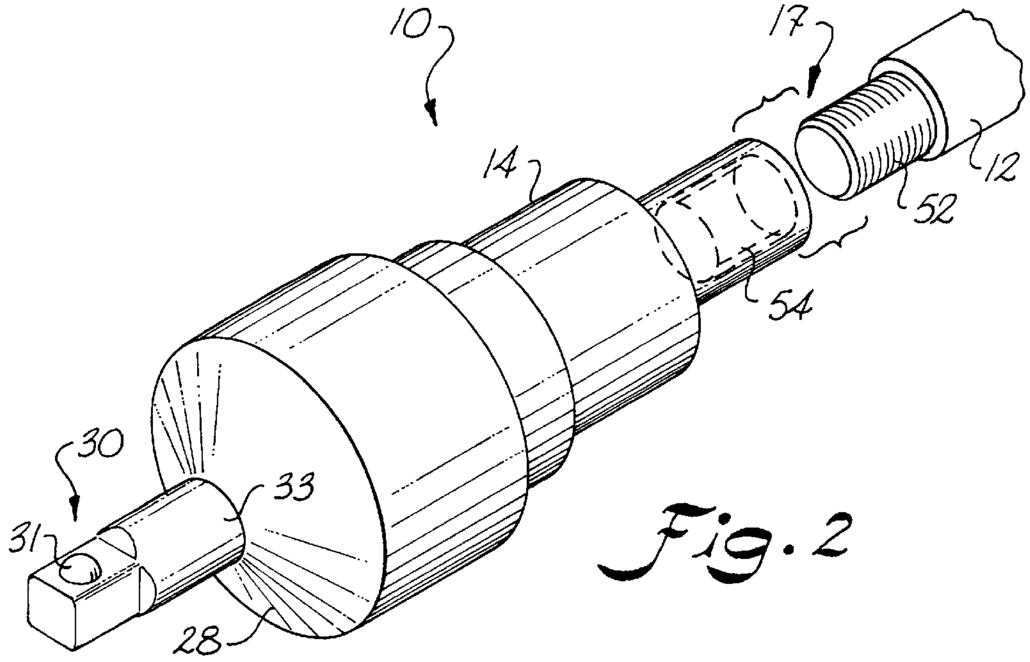
FIG. 2 is a perspective view of an alternative embodiment of the invention.

Reference will now be made in detail to one or more preferred embodiments of the present invention, examples of which are illustrated in the drawings. Each example is provided by way of explanation of the invention, and not meant as a limitation of the invention. For example, features illustrated or described as part of one embodiment can be used in another embodiment to yield still a further embodiment. It is intended that the present invention cover such modifications and variations as come within the scope and spirit of the invention.

Figure 4:
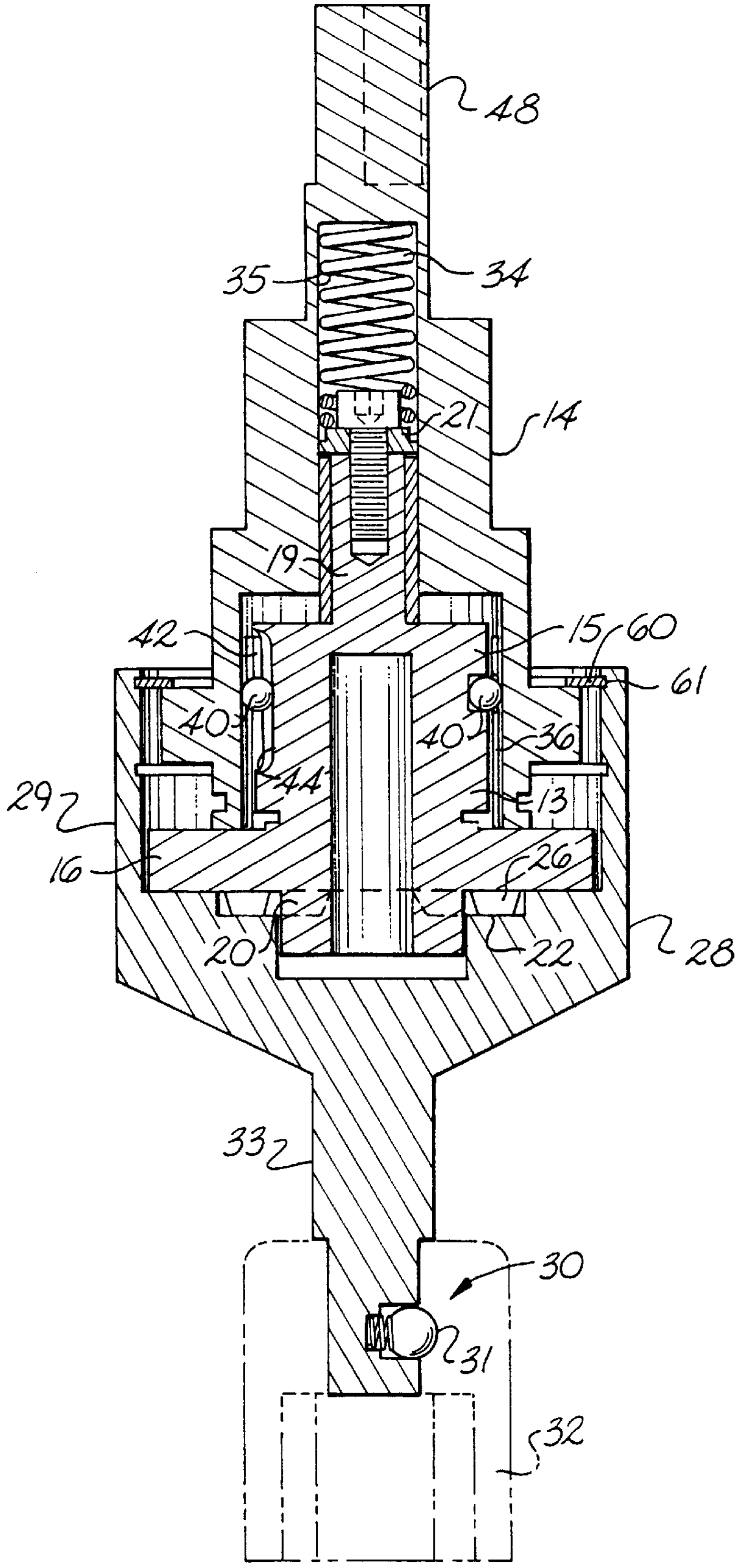
FIG. 4 is a cut-away view of an operational configuration of the invention.

The impact tool driver according to the invention is identified generally as 10. Impact tool driver 10 can be used in any application or environment wherein it is desired to impart an impacting drive to a tool. In the embodiments illustrated in the figures, impact tool driver 10 is illustrated as having a conventional ball detente mechanism 31 for attachment to any manner of tool. FIG. 4 illustrates a conventional socket 32 attached to device 10. However, it should be understood that this is for illustrative purposes only and the invention is not in any way limited to any specific type of tool or working device. Additionally, impact tool driver 10 can be configured with any conventional driving device, such as a conventional hand drill or other tool which has a driven spindle. Impact tool driver 10 is particularly suited for configuration with a drill in that it converts a conventional drill into an impact tool, as will be described below.

Figure 1:
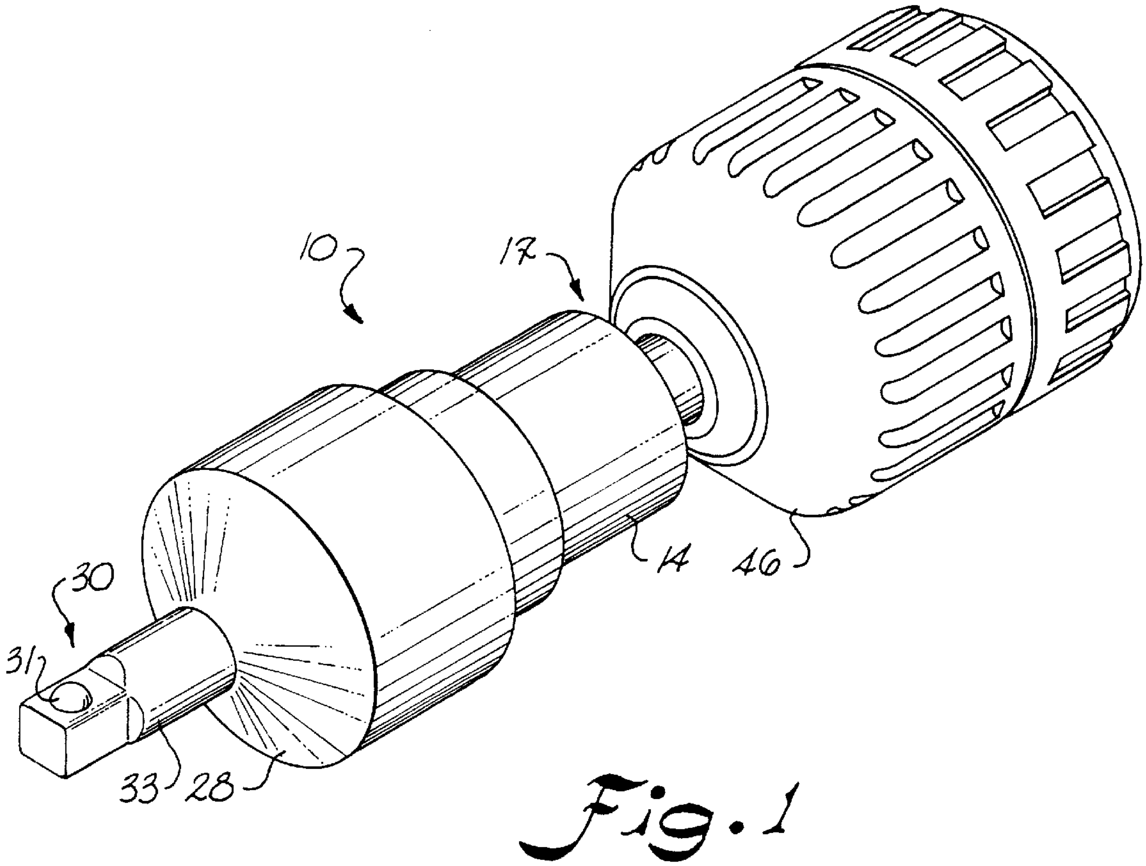
FIG. 1 is a perspective view of an embodiment of the present invention.
Figure 3:
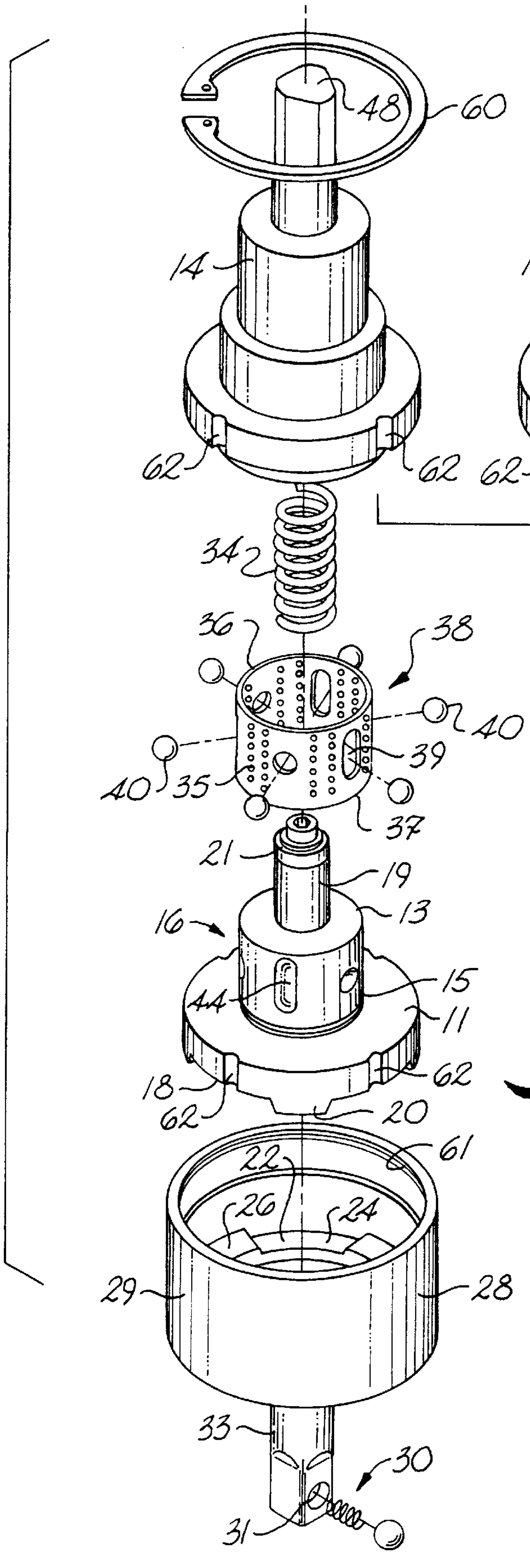
FIG. 3 is an in-line component view of the embodiments illustrated in FIGS. 1 and 2.
Figure 6:
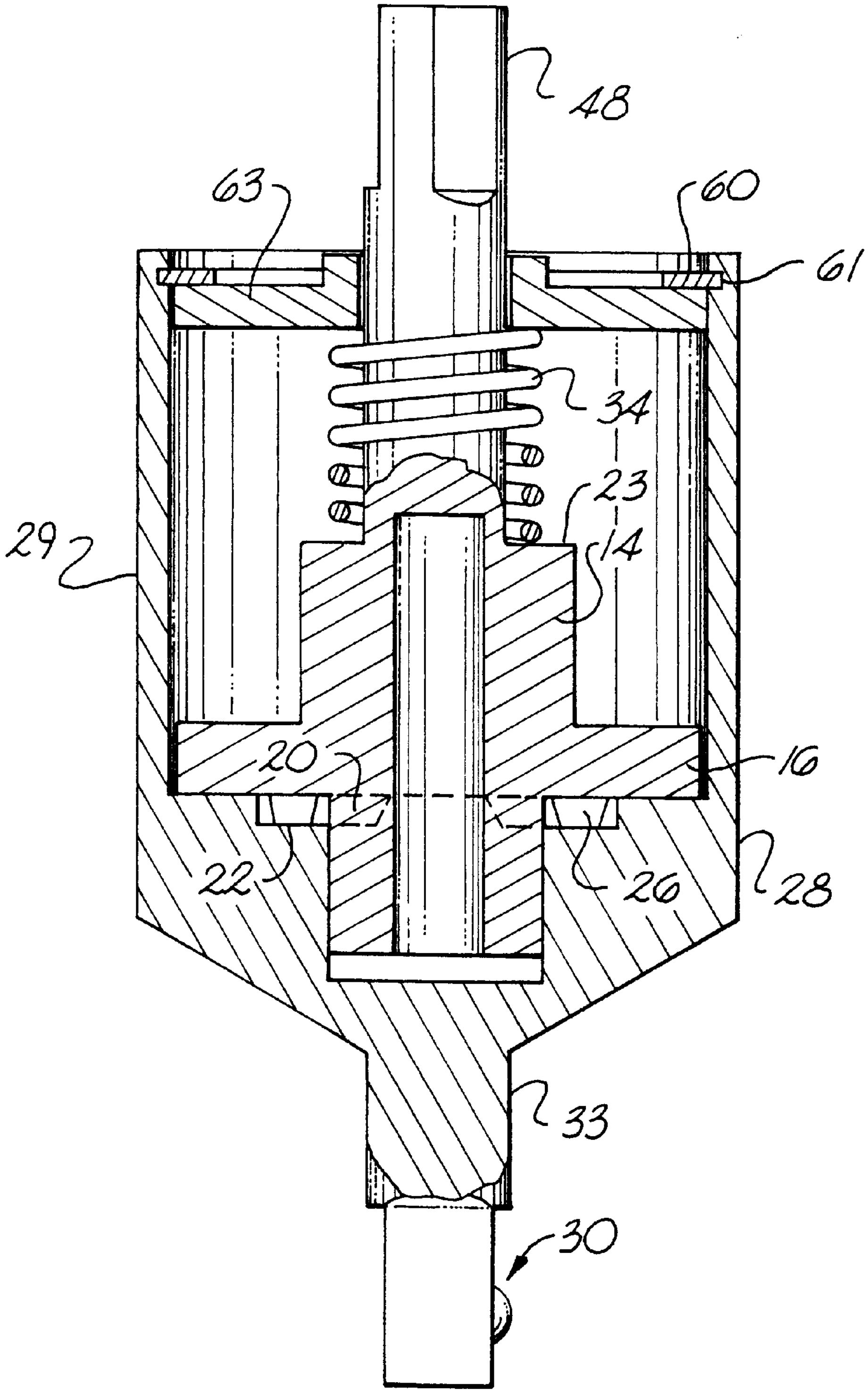
FIG. 6 is a cut-away view of an alternative embodiment of the invention as also illustrated in FIG. 3.

The figures also illustrate only exemplary means for removably attaching impact tool driver 10 to a drive spindle 12. For example, FIG. 1 illustrates device 10 held by a conventional chuck device 46. In this embodiment, impact tool driver 10 could simply have a shank portion or member 48. Shank 48 could be multi-sided as illustrated in FIGS. 3, 4, and 6. The means for removably attaching impact tool driver 10 could also include a threaded attachment means 17, as illustrated particularly in FIG. 2. FIG. 2 illustrates an embodiment wherein drive spindle 12 has a male threaded section 52 and impact tool driver 10 has a complementing female threaded section 54. The threaded sections could be interchanged so that impact tool driver 10 contains the male threads. It should be appreciated that any mechanical locking mechanism can be utilized for rotationally locking device 10 to a drive spindle. For example, although not illustrated, a set screw type of engagement between shank 48 and drive spindle 12 could be utilized. Also, any type of conventional chuck device could be utilized, including a keyed or keyless chuck. Any and all such locking mechanisms are within the scope and spirit of the invention and are included in the means for removably attaching impact tool driver 10 to a drive spindle 12.

The invention is also not limited by any type of means or mechanism for connecting a tool or working device thereto. The ball and detente device 31 illustrated in the figures is merely an example of one suitable device. For example, device 10 could include a square or multi-sided receptacle for receiving square or hex shaped tool bits. Similarly, the device could include a star shaped recess for mating configuration with a conventional star-shaped tool shank. A set screw device could also be utilized. These conventional connecting means are well understood by those skilled in the art and need not be explicitly described herein. Any and all such connecting means are within the scope and spirit of the invention.

Impact tool driver 10 includes a body member, generally 14, which is configured for attachment to a drive spindle of the tool, as described above. Body member 14 includes a section for receipt or attachment to a drive spindle, as generally indicated by shank portion 48. Body member 14 is rotationally driven by the drive spindle of the power tool once body member 14 is rotationally locked to the drive spindle.

Tool driver 10 includes a first impact member 16 connected to body member 14 so as to be rotationally driven thereby. In the embodiment illustrated in FIGS. 3 and 4, impact member 16 includes an axial floating member 13 which is received in body member 14. Floating member 13 includes a cylindrical portion 15. The first impact member 16 includes an annular member 11 configured with cylindrical portion 15. Member 13 axially "floats" within body member 14 in that it is capable of moving axially or longitudinally within body member 14, as will be described in more detail below.

Impact member 16 includes a plurality of radially spaced impact lugs 20 defined on a forward facing face 18 of annular member 11, as particularly seen in FIGS. 3 and 4. Impact lugs 20 are formed with angled side members 58, as particularly seen in FIGS. 5*a* through 5*d*.

Floating member 13 is rotationally coupled to body member 14 by means of a ball drive mechanism 38, as particularly seen in FIG. 3. Ball drive mechanism 38 includes a plurality of balls 40 which reside in slots 44 defined in floating member 13 and corresponding slots 42 defined in body member 14, as particularly seen in FIG. 4. Slots 42 and 44 have a longitudinal length which defines the degree of axial movement of floating member 13 within body member 14.

A bearing mechanism 36 is operationally disposed between floating member 13 and body member 14 to reduce friction caused by axial movement of floating member 13. In the embodiment illustrated, bearing device 36 includes a sleeve 37 with a plurality of ball bearings 35 carried therein. Longitudinal slots 39 are also defined in sleeve 37 to incorporate balls 40. Sleeve 37 fits around cylindrical portion 15 of floating member 13.

In the embodiment illustrated in FIGS. 3 and 4, a spring mechanism 34 is operationally disposed so as to bias floating member 13 axially forward. Spring 34 is housed in a recess 35 defined in body member 14 and abuts against an annular surface 21 of floating member 13. Operation of spring mechanism 34 will be described below.

Device 10 includes a second impact member, generally 22. Second impact member 22 is configured so as to be driven rotationally by first impact member 16 through periodic rotational engagement of opposing impact lugs 20, 26. In the embodiment illustrated, second impact member 22 is defined as an annular ring or surface having a face 24 with impact lugs 26 defined thereon, as particularly seen in FIGS. 3 and 5*a* through 5*d*. Second impact member 22 is rotationally locked with a drive member 28 so that drive member 28 is driven thereby. In the embodiments illustrated, second impact member 22 and drive member 28 are formed as integral components. However, it should be understood that second impact member 22 could be rotationally coupled to drive member 28 by any conventional means.

Drive member 28 includes a sleeve section 29 which extends axially rearward and generally surrounds body member 14 and floating member 13. Drive member 28 is retained on body member 14 by means of a spring clip 60 which is received in a groove 61 formed on the inner surface of drive member 28.

Figure 5A:
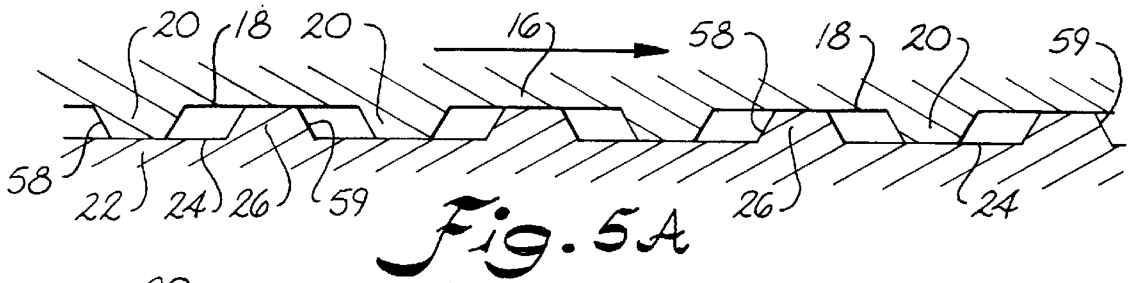
FIGS. 5*a* through 5*d* are sequential views illustrating the operation of the impact lugs according to the invention.

The engaging mechanism of opposing impact lugs 20 carried on first impact member 16 and lugs 26 carried on second impact member 22 is illustrated in the operational sequential views of FIGS. 5*a* through 5*d*. FIG. 5*a* illustrates first impact member 16 being rotationally driven in the direction of the arrow. In other words, when the power drill or other tool to which impact member 10 is attached is driven in one rotational direction, body member 14 is rotationally coupled to the drive spindle of the tool and is driven in the same direction. Body member 14 is rotationally coupled to floating member 13 through the balls 40 engaging in slots 42 and 44, thereby causing floating member 13 to also be driven rotationally in the same direction. First impact member 16 is carried by the floating member 13 and is thus also rotationally driven in the same direction. Impact lugs 20 of the first impact member 16 are rotationally driven and the angled sides 58 thereof impact against the angled sides 59 of lugs 26. This collision or impact between the lugs causes the second impact member 22 to be rotationally driven in the same direction.

Figure 5B:
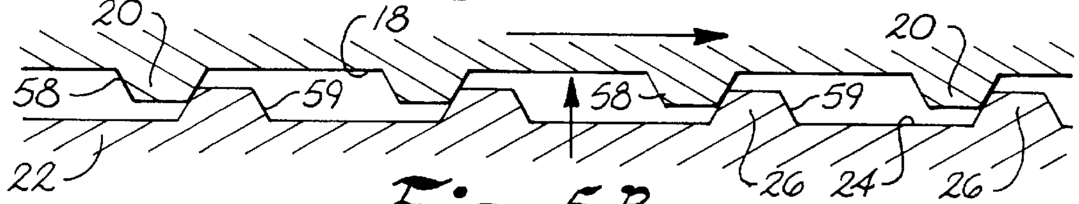
Figure 5C:
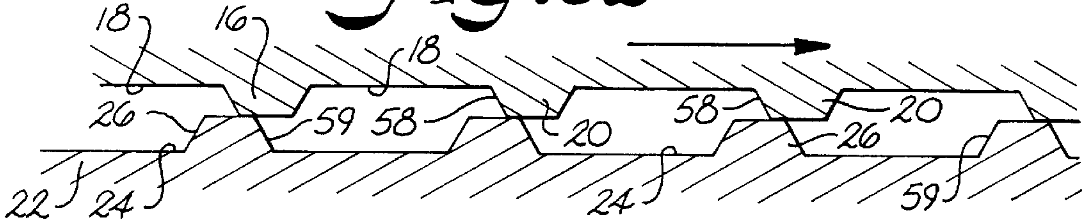
Figure 5D:
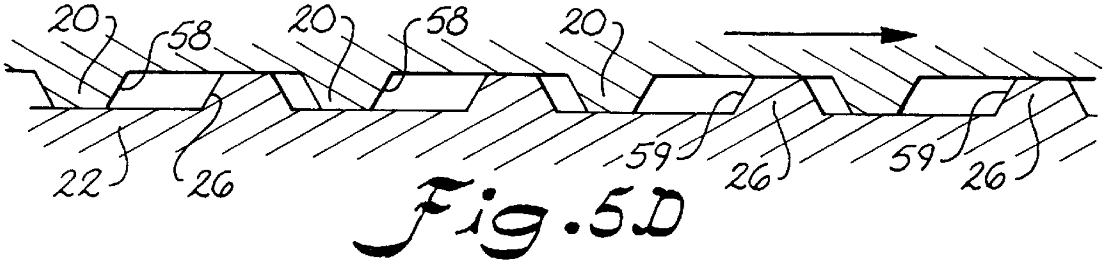

FIG. 5*b* illustrates the angled sides 58 of lugs 20 impacting angled sides 59 of lugs 26. As explained, this impacting will drive the second impact member in the same rotational direction. Due to the angles of sides 58 and 59, the impact members are driven axially apart as the first impact member 16 continues to rotate. As illustrated in FIG. 5*c*, the impact members axially separate until impact lugs 20 slide over opposing lugs 26. Once the lugs slide over each other, lugs 20 are again forced axially forward by the action of spring 34 in between opposing lugs 26 until the next rotational impact with lugs 26. Thus, there is a continuous rotational impacting of lugs 26 on the second impact member causing the second impact member and drive member to be driven in the rotational direction of the body member and drive spindle.

It should be understood that floating member 13 axially moves or "floats" within body member 14 in the embodiments illustrated in FIGS. 3 and 4 at least for the axial length of the impact lugs. This longitudinal movement is absorbed by floating member 13 and spring 34. This embodiment imparts far less vibration to the user of the tool driver and drill.

As particularly seen in FIG. 3, longitudinal slots 62 are defined in body member 14 and floating member 13. Slots 62 act as passages for air as floating member 13 moves axially within body member 14 and drive member 28. Passages 62 prevent the mechanisms from acting as a piston and becoming airbound or locked.

An alternative embodiment of the invention is illustrated in FIG. 6 and the right hand side of FIG. 3. In this embodiment, body member 14 and first impact member 16 form an integral component. The floating member 13 is absent and first impact member 16 is formed as an annular ring directly on body member 14. Lugs 20 are defined on the forward facing face of annular ring 16. In this embodiment, drive member 28 includes a longer sleeve section 29 which surrounds body member 14 and first impact device 16. As with the other embodiment, second impact device 22 is formed as an annular face within body member 28 and includes impact lugs 26 oppositely facing impact lugs 20. The operation of the impact lugs is as described above.

Spring 34 is disposed in this embodiment between an annular ridge 23 defined on body member 14 and a plate 63 surrounding shank portion 48 of body member 14. Plate 63 is retained relative to drive member 28 by clip spring 60 residing in groove 61. Spring 34 thus biases drive member 28 axially rearward and forces lugs 20, 26 into an engaging configuration. When body member is rotationally driven, the impact lugs interact as described above and drive member 28 with second impact member 22 is forced axially away from first impact member 16 against the force of spring 34. Once the lugs slide over each other, spring 34 causes lugs 26 to move between lugs 22 until the next impact occurs.

The embodiment illustrated in FIG. 6 is simpler and easier to manufacture and assemble than the device illustrated in FIG. 4. However, the device illustrated in FIG. 6 does impart more vibration to the user of the impact tool driver.

It should be understood by those skilled in the art that the driving force of the impact drive mechanism depends on a number of factors. For example, the angle of angled surfaces 58, 59 of lugs 20, 26 respectively will affect the degree of force transmitted for each impact. There is less force transmitted for greater angles. Maximum force would be transmitted if the impact lugs were defined by straight or perpendicular side segments. However, if that were the case, the lugs would not be able to slide over each other.

The mass of the drive member and second impact surface is also a consideration. Preferably, the mass of drive member 28 and second impact member 22 carried therewith is less than that of body member 14 and first impact member 16.

The rotational speed of the impact lugs is also a consideration and will be affected by the rotational speed of the drive spindle as well as the diameter of the first and second impact members.

The force of the spring mechanism 34 will also affect the impacting drive mechanism. A weaker spring will generate less rotational drive with each impacting occurrence of the lugs.

It is well within the level of skill of those in the art to design an impact tool driver according to the present invention with consideration being given to the variables and parameters which will affect the driving force of the impact device depending on the intended environment and use of the impact tool driver. Various modifications and variations can be made in the device without departing from the scope and spirit of the device. It is intended that the present invention cover such modifications and variations as come within the scope of the appended claims and their equivalents.

What is claimed is:

1. An impact tool driver configured for removable attachment with a drive spindle of a power tool, comprising:

- a body member removably attachable to a drive spindle of a power tool;
- a first impact member operably connected to said body member so as to be rotationally driven thereby, said first impact member further comprising a first face having a plurality of radially spaced impact lugs defined thereon and wherein said first impact member is axially movable relative to said body member;
- a second impact member comprising a second face having a plurality of radially spaced impact lugs defined thereon for engaging contact with said impact lugs defined on said first face;
- a drive member operably connected with said second impact member and rotationally mounted on said body member, said drive member further comprising means for connecting a tool or working device thereto, wherein rotational drive of said body member and first impact member is imparted to said second impact member and drive member through rotational impacting engagement of said impact lugs;
- a spring mechanism disposed between said body member and said first impact member to bias said first impact member towards said second impact member; and
- a bearing mechanism operably disposed between said body member and said first impact member.

2. The tool driver as in claim 1, further comprising a ball drive mechanism for rotationally coupling said first impact member to said body member, said ball drive mechanism defining a range of axial movement of said first impact member relative to said body member.

3. The tool driver as in claim 1, further comprising a longitudinally extending shank on said body member, said shank having a length and shape for receipt by a conventional chuck device.

4. The tool driver as in claim 1, further comprising a threaded attaching member on said body member for threaded engagement with a drive spindle of a power tool.

5. The tool driver as in claim 1, wherein said means for removably connecting said tool driver to a drive spindle comprises a mechanical locking mechanism for rotationally locking said body member to a drive spindle.

6. The tool driver as in claim 1, wherein said second impact member is formed integral with said drive member.

7. The tool driver as in claim 1, wherein said impact lugs comprise complimenting angled side surfaces wherein upon rotational impacting contact with opposing said impact lugs in either rotational direction, opposing said angled side surfaces of said impact lugs on said first and second impact members engage and drive said first and second impact members longitudinally apart until said side surfaces disengage and said impact lugs slide over each other.

8. The tool driver as in claim 1, wherein said drive member and said second impact member have a mass less than that of said body member and said first impact member.

9. The tool driver as in claim 1, further comprising a spring mechanism disposed to bias said first and second impact members toward each other.

10. The tool driver as in claim 9, wherein said first impact member axially floats relative to said body member and said spring mechanism is operably disposed between said body member and said first impact member to bias said first impact member axially away from said body member towards said drive member.

11. An impact tool driver configured for removable attachment with a drive spindle of a power tool, comprising:

- a body member removably attachable to a drive spindle of a power tool;
- a drive member rotationally mounted relative to said body member and comprising a tool attaching device to removably attach a tool or working device thereto;
- an impact drive mechanism operably disposed between said body member and said drive member, said impact drive mechanism comprising oppositely facing impact lugs configured with said body member and said drive member wherein rotational drive of said body member is imparted to said drive member by periodic rotational impacting of said impact lugs;
- a longitudinally movable impact member rotationally coupled to said body member, said impact lugs configured with said body member being defined on an annular face of said impact member; a spring mechanism operably disposed between said impact member and said body member to bias said impact member towards said drive member; and a bearing mechanism disposed between said impact member and said body member for axial movement therebetween.

* * * * *